(No Model.) 2 Sheets—Sheet 1.

C. BABCOCK.
POTATO DIGGER.

No. 378,646. Patented Feb. 28, 1888.

WITNESSES
Geo. A. Darby
N. Dallenford

INVENTOR
Charles Babcock
by G. Danowsky
atty.

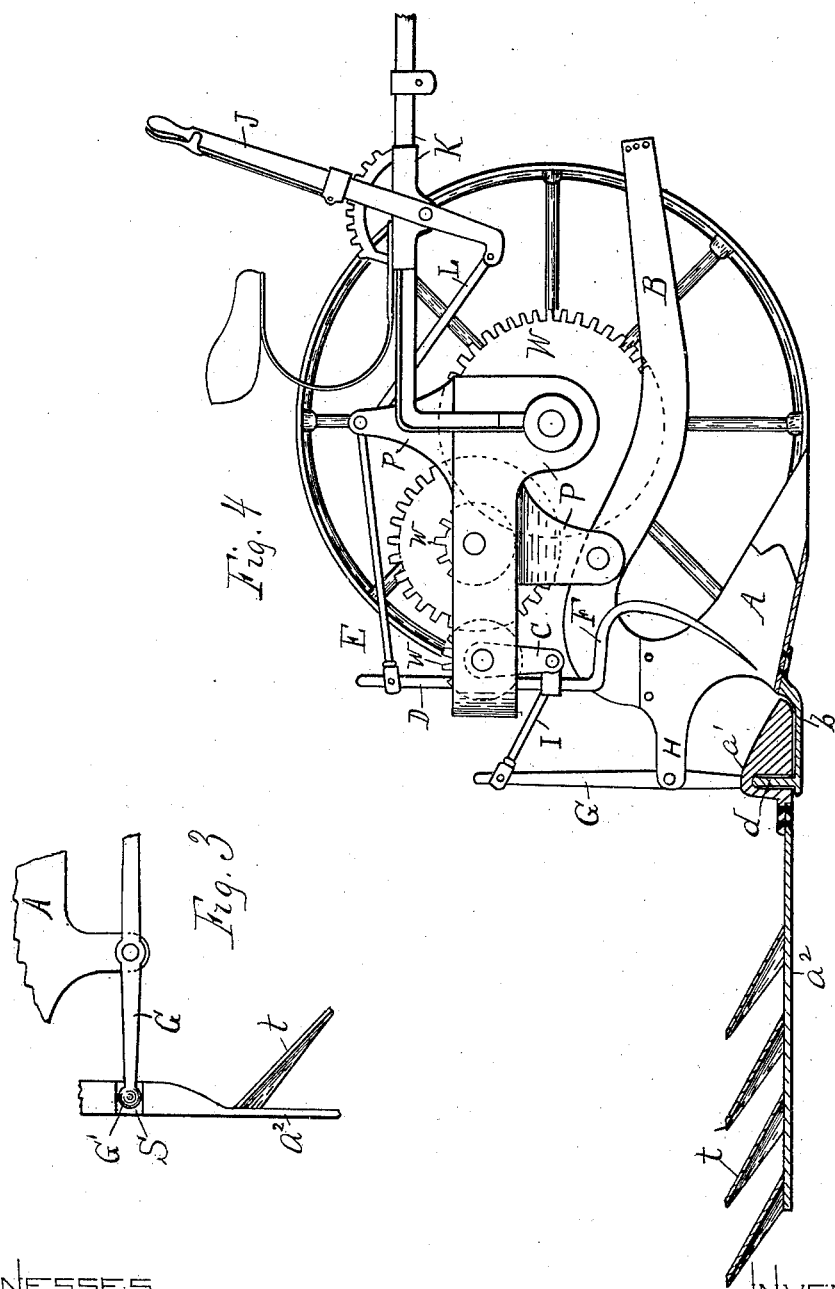

UNITED STATES PATENT OFFICE.

CHARLES BABCOCK, OF TROY, NEW YORK, ASSIGNOR OF ONE-FOURTH TO J. MARSHALL FOSTER, OF SAME PLACE.

POTATO-DIGGER.

SPECIFICATION forming part of Letters Patent No. 378,646, dated February 28, 1888.

Application filed June 22, 1887. Serial No. 242,104. (No model.)

*To all whom it may concern:*

Be it known that I, CHARLES BABCOCK, a resident of the city of Troy, in the county of Rensselaer and State of New York, have invented certain new and useful Improvements in Potato-Diggers; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in potato-diggers, and more particularly to improvements in the digger shown and described by me in Letters Patent of the United States No. 338,133; and it consists of the novel construction and combination of parts hereinafter described, and pointed out in the claims.

The object of the invention is to effect a better separation of the potatoes from the soil after they have been dug up by the plow and leave the potatoes upon the top of the soil exposed to view convenient for picking up.

Figure 1:
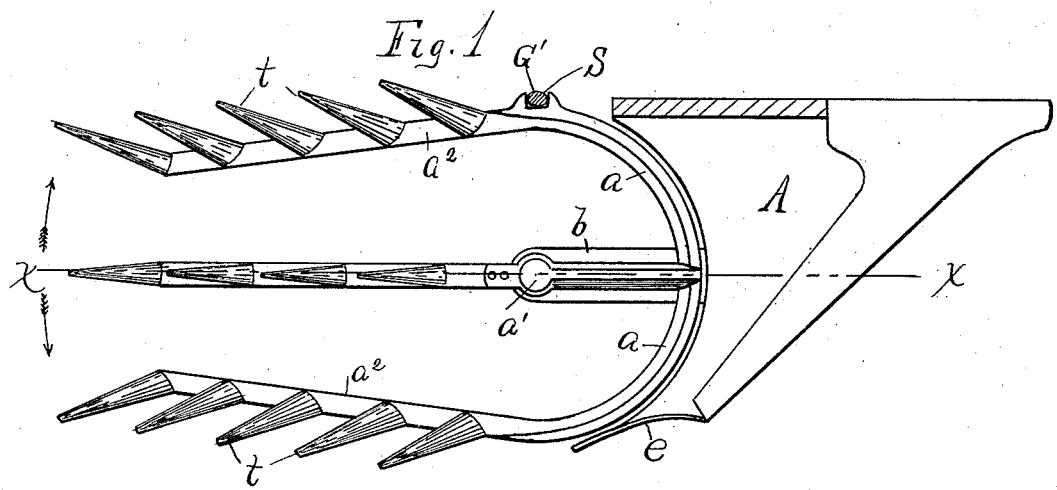
Figure 2:
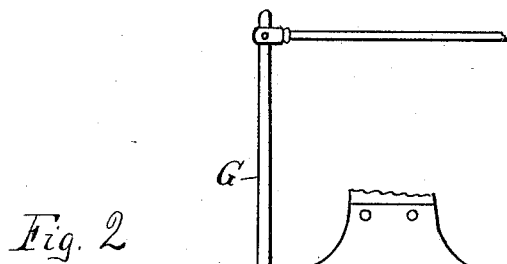

Figure 1 of the drawings is a plan view of my improved plow and separator detached. Fig. 2 is a side elevation of same. Fig. 3 is an elevation of a portion of the opposite side. Fig. 4 is a central vertical section taken on the broken line $x\ x$ in Fig. 1, including a side elevation of the operating mechanism.

The plow A is provided with a beam, B, which is supported by a carriage-frame, the wheels of which drive a train of gear-wheels, W, to actuate a pair of forks or kickers, F, through cranks C, all substantially as shown and described in said Letters Patent No. 338,133, dated March 16, 1886. The fork-arms D are pivoted to one end of the connecting-links E, which in turn are pivoted at their other ends to the carriage-frame.

My improved separator consists of the segmental frame $a$, centrally pivoted upon an arm, $b$, projecting rearwardly from the plow, and provided with the pivot $d$, adapted to enter a corresponding aperture in the central frame projection, $a'$.

The frame is provided with the upwardly and outwardly projecting spurs or teeth $t$, located, about as shown, upon a plurality of rearwardly-projecting arms, $a^2$, also with the socket S, adapted to receive one end of the lever G, pivoted upon a fixed support, as arm H, projecting from the plow or plow-beam, the other end of the lever being pivotally connected with the crank C by a link, I.

The operation of the separator is as follows: The revolutions of the crank C, through link I, impart to the lever G an oscillatory movement, and the separator is thereby given a vibratory rotary movement on the pivot $d$ and in an approximately-horizontal plane. The plow A and forks F loosen the soil and dig up the potatoes, which fall within the separator as the plow travels from under them. The vibratory rotary movements of the frame and teeth of the separator agitate the loosened soil and potatoes and throw the latter to the surface of the soil, leaving them clearly exposed to view in a row behind the separator. As the separator follows in the immediate wake of the plow and in a plane a little above the horizontal cutting-plane of the plow, it is not required to do any heavy work of breaking up the ground, is protected from injury, and easily operated. The side board or wing, $e$, attached to the side of the plow and having about the form and position shown in Figs. 1 and 2, serves to prevent the soil containing potatoes from being thrown by the plow outside of or beyond the reach of the separator and to clear away any light obstruction which might interfere with the easy operation of the separator. The hand-lever J, pivoted upon the seat-frame K, is linked to the movable plow and separator frame by link L, and serves to adjust the depth of the cutting-plane of the plow while in use, or to lift and hold the plow and separator above the ground while being transported from one field to another, as fully described in said Letters Patent No. 338,133. The vibratory movements of the frame with its large open space within the segmental rim causes the soil and potatoes to discharge or flow freely over the plow and from the frame.

The parts of the frame occupy so small a space, compared with the size of the openings, the soil does not adhere to it, clog up, and ride along with it, but adheres rather to the undisturbed soil beneath and freely slides off. Much less power is therefore required to operate the separator, for the reason that whenever soil accumulates upon the moving parts of a machine the accumulations are so much dead-weight to be moved, and the more rapid the movements the more power required. The plow will also run easily without clogging when there are no obstructions or banking up in its rear. The plow and separator can also be more easily raised by means of the handle J when the separator is free from soil accumulations. The teeth $t$ assist in breaking up the soil and bringing the potatoes to the surface.

What I claim as new, and desire to secure by Letters Patent, is—

1. The combination, with a sulky potato-digger plow provided with a vertical separator-pivot projected rearwardly therefrom, of a horizontally-vibratory separator consisting of a frame circular at one end and terminating in rearwardly-projecting arms at the other end, the circular end being provided with a central pivot-socket and the arms with upwardly and rearwardly projecting teeth, and means for communicating to said separator vibratory movements, substantially as described, and for the purposes set forth.

2. The combination, with the plow of a potato-digger and vibratory separator pivotally supported in the wake of the plow and provided with means, substantially as described, for imparting to said separator horizontally-vibratory movements, of a side-board, $e$, secured to the side of said plow, substantially as described, and for the purposes set forth.

In testimony whereof I have hereunto set my hand this 3d day of June, 1887.

CHARLES BABCOCK.

Witnesses:
GEO. A. MOSHER,
W. H. HOLLISTER, Jr.